United States Patent
Leong et al.

(10) Patent No.: US 9,160,519 B1
(45) Date of Patent: Oct. 13, 2015

(54) COMMUNICATIONS WITH SYNCHRONIZATION

(71) Applicant: NXP B.V., Eindhoven (NL)

(72) Inventors: Frank Leong, Veldhoven (NL); Andries Hekstra, Eindhoven (NL); Arie Koppelaar, Giessen (NL); Stefan Drude, Waalre (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/468,006

(22) Filed: Aug. 25, 2014

(51) Int. Cl.
  *H04L 7/00* (2006.01)
  *H04L 12/26* (2006.01)

(52) U.S. Cl.
  CPC .......... *H04L 7/0037* (2013.01); *H04L 7/0012* (2013.01); *H04L 43/0864* (2013.01)

(58) Field of Classification Search
  USPC ................... 375/354, 355, 358, 368; 713/503
  See application file for complete search history.

(56) References Cited

U.S. PATENT DOCUMENTS

| | | | |
|---|---|---|---|
| 6,618,456 B1 * | 9/2003 | Lansdowne .................. | 375/354 |
| 7,444,118 B2 | 10/2008 | Boh et al. | |
| 8,620,394 B2 | 12/2013 | Sebastiano et al. | |
| 2012/0105219 A1 | 5/2012 | Kofler | |
| 2012/0303996 A1 * | 11/2012 | Bauernfeind ................. | 713/503 |
| 2013/0214732 A1 | 8/2013 | Nowottnick | |

OTHER PUBLICATIONS

AMS, AS3932 Datasheet—Applications "3D Low Frequency Wakeup Receiver", Revision 1.7, pp. 1-34, www.ams.com/LF-Receiver/AS3932.
M. van Elzakker et al., "A 10-bit Charge-Redistribution ADC Consuming 1.9 uW at 1 MS/s," IEEE JSSC, May 2010.
I.-Y. Lee et al., "A Fully Integrated TV Tuner Front-End with 3.1dB NF, >+31dBm OIP3, >83dB HRR3/5 and >68dB HRR7," IEEE ISSCC, 2014.
Harpe et al., "A 0.47-1.6 mW 5-bit 0.5-1 GS/s Time-Interleaved SAR ADC for Low-Power UWB Radios," IEEE JSSC, Jul. 2012.
J. van Sinderen et al., "Wideband UHF ISM-Band Transceiver Supporting Multichannel Reception and DSSS Modulation," IEEE ISSCC, 2013.

* cited by examiner

*Primary Examiner* — Khai Tran

(57) ABSTRACT

Aspects of the present disclosure are directed to communications between devices. As consistent with one or more embodiments, a local device has a first clock, a low-frequency (LF) transmitter and a high-frequency (HF) transceiver. A remote device includes a second clock, a LF receiver and a HF transceiver. An LF signal is transmitted from the local device to the remote device and used to synchronize the second clock. The first clock is synchronized based on an HF signal transmitted to the local device using the synchronized second clock and a first predetermined time delay relative to receipt of the LF signal. The second clock is re-synchronized based on a second HF signal transmitted to the remote device using the first clock and a second predetermined time delay relative to receipt of the first HF signal, while accounting for a trip time for communicating one or both of the HF signals.

20 Claims, 6 Drawing Sheets

COMMUNICATIONS WITH SYNCHRONIZATION

Aspects of various embodiments are directed to communications, and to communications with synchronization.

Many communication approaches require synchronization and authentication, which have been implemented using a multitude of approaches. For instance, RF ranging systems often employ a time-of-flight principle to determine a distance between two objects, or markers on objects, that are communicating between one another. Proximity can be used from a security and authentication perspective, such as by ensuring that a remote device to be connected to a local device via Bluetooth is within a predetermined threshold distance of the local device (e.g., to prevent unwanted connections to other Bluetooth devices in relative proximity).

In many applications, a waveform (e.g., a chirp or a pulse) can be transmitted and reflected or retransmitted by an object. Based on the amount of time it takes for the reflection or retransmission to return to the original transmitter, the distance between the objects can be ascertained.

While various approaches have been implemented for communications in these regards, degradation of the radio signals (e.g., attenuation and reflection) can pose problems. Timing misalignment, interference from other (radio) systems and thermal noise from various sources can also pose problems. With particular regard to timing misalignment, detecting and correcting for such issues can involve an undesirable amount of time and power. For instance, in applications in which packet data is involved, the preamble of the packets can be relatively long compared to the payload, which has an effect on latency and power consumption. These issues can be particularly relevant to certain types of communications, such as in automotive access.

These and other matters have presented challenges to communications and related aspects such as timing alignment, for a variety of applications.

Various example embodiments are directed to communication circuits, methods and their implementation.

According to an example embodiment, communications are effected between a local device and a remote device. The local device has a first clock, a low-frequency (LF) transmitter and a high-frequency (HF) transceiver. The remote device has a second clock, an LF receiver and an HF transceiver. An LF signal is transmitted from the local device to the remote device, and the second clock is synchronized based on the LF signal. A first HF signal is transmitted from the remote device to the local device using the synchronized second clock and a first predetermined time delay relative to receipt of the LF signal at the remote device. The first clock is synchronized based on the first HF signal, and a second HF signal is transmitted from the local device to the remote device using the first clock and a second predetermined time delay relative to receipt of the first HF signal at the local device. The second clock is re-synchronized based on the second HF signal, while accounting for a trip time for at least one of: communicating the first HF signal from the remote device to the local device, and communicating the second HF signal from the local device to the remote device. This approach may be carried out at either the local or remote device, and may be applicable to embodiments involving the local device, the remote device, or both the local and remote devices. Such approaches may, for example, be implemented for minimizing both power consumption and latency overhead due to RF ranging.

Another embodiment is directed to a method for authenticating a remote device for accessing a local device. A clock is synchronized at the remote device based on an LF signal communicated by the local device. A message is transmitted in a first HF signal from the remote device to the local device, using the synchronized clock and a first predetermined time delay. The local device responds to the first HF signal by synchronizing a clock at the local device based on the first HF signal, and by transmitting the message back to the remote device in a second HF signal using the synchronized clock and a second predetermined time delay. The remote device responds to the second HF signal by re-synchronizing the clock at the remote device, determining a round-trip time for communicating the message from the remote device to the local device and back to the remote device, encrypting the determined round-trip time, and communicating the encrypted round-trip time to the local device. The local device permits the remote device to access data at the local device, based on the encrypted round-trip time. In a particular implementation, the clock is synchronized at the remote device as follows.

The LF signal is transmitted via an LF transmitter at the local device to an LF receiver at the remote device and an HF transceiver at the remote device is pre-synchronized. A communication link is established between the local and remote devices via an LF polling process including the LF signal. A distance between the local and remote devices is estimated based on the strength of LF signals communicated during the polling process, and an HF transceiver at the local device is pre-synchronized based on the LF polling process and the estimation.

Another embodiment is directed to an apparatus for communicating between a local device having a first clock, an LF transmitter and an HF transceiver, and a remote device having a second clock, an LF receiver and an HF transceiver. The apparatus includes an LF communication circuit that communicates an LF signal from the local device to the remote device, and provides synchronization of the second clock at the remote device based on the LF signal. The apparatus also includes an HF communication circuit that operates with the LF communication circuit to provide synchronization as follows. A first HF signal is communicated from the remote device to the local device using the second clock and a first predetermined time delay relative to receipt of the LF signal at the remote device. The first clock is synchronized based on the first HF signal, and a second HF signal is communicated from the local device to the remote device using the first clock and a second predetermined time delay relative to receipt of the first HF signal at the local device. The second clock is re-synchronized based on the second HF signal, while accounting for a trip time for at least one of: communicating the first HF signal from the remote device to the local device, and communicating the second HF signal from the local device to the remote device. As consistent with the above, this approach may be implemented with various embodiments, including those directed to the local device, to the remote device, or to both the local and remote devices.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
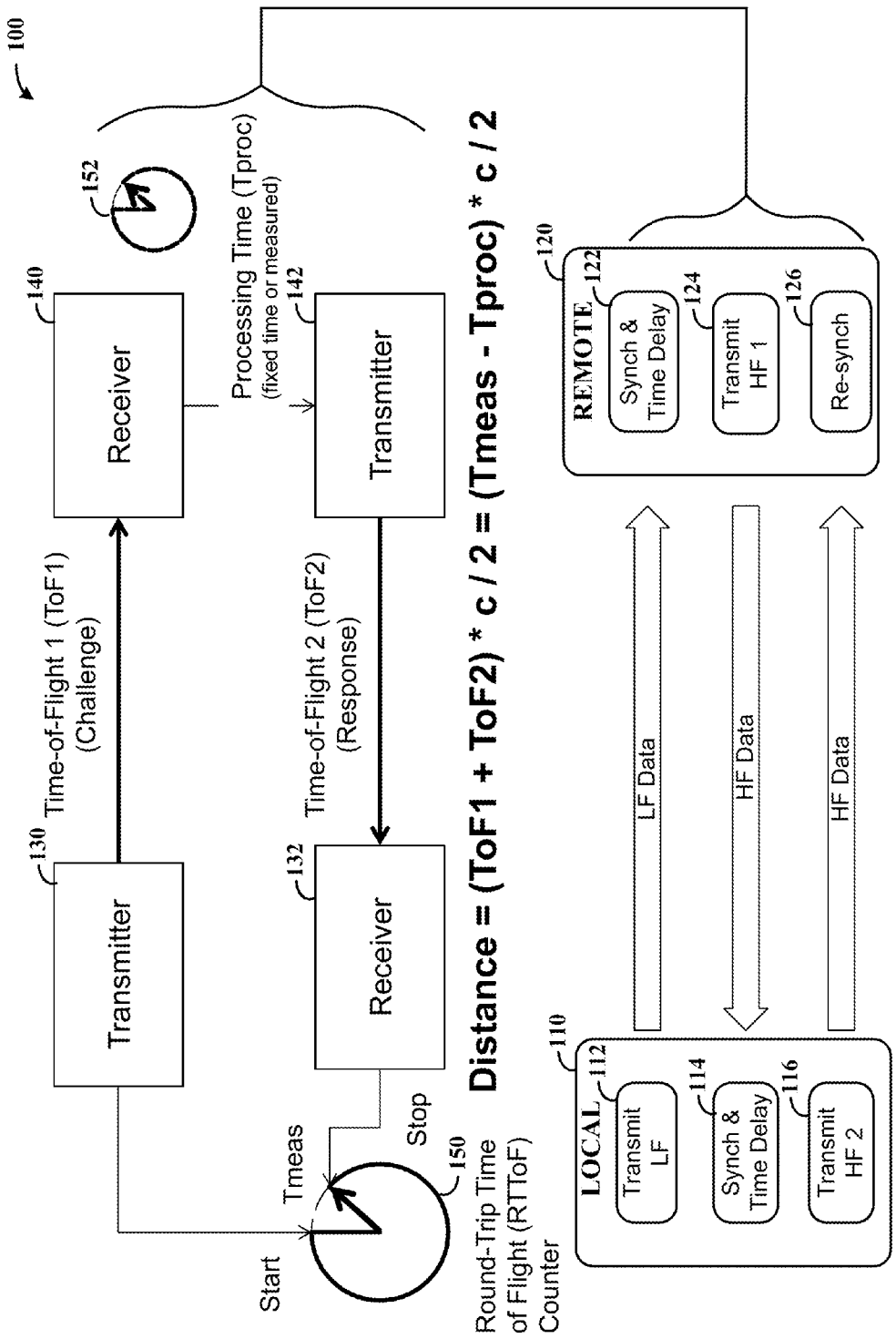
FIG. 1 shows a communication apparatus and approach involving synchronization and time-of-flight calculation, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving data communication and synchronization. While not necessarily so limited, various aspects may be appreciated through a discussion of examples using this context.

Various example embodiments are directed to reducing acquisition time using side-channel synchronization information, which can be implemented to reduce power requirements for synchronization. Various embodiments are directed to addressing issues relating to this communication. For instance, certain embodiments operate to reduce required on-time by synchronizing two radio nodes over a parallel LF radio link, thereby significantly reducing overall system power consumption. Further embodiments involve communications carried out for data packets in which the preamble includes data that can be used to address frequency, phase and time ambiguities, and/or to facilitate power-saving duty-cycled packet detection, which can be effected before the payload of the packet starts.

Such approaches are applicable to embodiments in which power consumption is a concern, as is applicable to a variety of radio frequency (RF) ranging (distance) applications, such as those involving short-distance communications for automotive, Bluetooth, near-field communications (NFC), IEEE 802.15.4a, impulse radio ultra-wideband (IR-UWB) applications such as ZigBee (IEEE 802.15), and pulse radars at 60 GHz and higher frequencies. For instance, in IR-UWB RF ranging systems, synchronization requirements may easily dominate on-time requirements over the ranging payload itself.

According to another example embodiment, communications are effected between a local device and a remote device, each device having a clock and an HF transceiver, with the local device having an LF transmitter and the remote device having an LF receiver. The LF and HF communications may, for example, be carried out using a single channel or separate channels and separate or combined receiver/transmitter/transceiver components. The local device transmits an LF signal to the remote device, which synchronizes its clock based on the LF signal and transmits an HF signal back to the local device using the synchronized clock and a predetermined time delay (e.g., relative to the LF signal). The local device synchronizes its clock using the HF signal, and transmits another HF signal to the remote device using its clock and another predetermined time delay (e.g., relative to receipt of the HF signal). The remote device resynchronizes its clock based on the HF signal transmitted by the local device, while accounting for a trip time for the communication. The trip time may, for example, pertain to communicating the HF signal from the remote device to the local device, communicating the HF signal from the local device to the remote device, or a round-trip time corresponding to both communications. The trip time may, for example, involve communicating an encrypted packet from the remote device to the local device and back to the remote device, with verification provided via the round-trip time and the encryption. Other approaches may involve a trip time for a packet initially communicated by the local device, and retransmitted back to the local device by the remote device.

The above and other embodiments herein describing communications may be carried out at a local device, at a remote device, or at both the local and remote devices. As such, various embodiments are directed to methods or apparatuses corresponding to one or both of the local and remote devices. Consistent with the above, such embodiments can be implemented for minimizing both power consumption and latency overhead due to RF ranging.

The above-noted communication approach can be carried out in a variety of systems and with a variety of methods. In a more particular embodiment, one or both of the local and remote devices operates using duty-cycled packet detection for packets having a preamble that is longer than a payload of the packet. The communications may be carried out so as to mitigate issues relating to synchronization requirements of an IR-UWB RF ranging system, in which the synchronization may dominate on-time requirements, such as by reducing power consumption. The local and remote devices transmit and receive the LF signal respectively using an LF transmitter and an LF receiver, and transmit and receive the HF signals using HF transceivers that are respectively separate from the LF transmitter and the LF receiver.

Synchronization is carried out in a variety of manners, to suit particular embodiments. In some embodiments, the local device clock is synchronized based on the HF signal transmitted by the remote device, together with the first predetermined time delay and a time at which the initial LF signal was transmitted from the local device. In other embodiments, re-synchronizing the clock at the remote device is carried out based on the predetermined time delay implemented at the local device and a time at which the first HF signal was transmitted from the remote device. In certain embodiments, both synchronization and resynchronization are carried out as above.

In some embodiments, the remote device's clock is resynchronized based on the HF signal transmitted by the local device and a round-trip time as determined for communicating a message in the first HF signal from the remote device to the local device, and for retransmitting the message in the second HF signal from the local device back to the remote device. In some implementations, the round-trip time is encrypted at the remote device, transmitted to the local device, and used for authentication of communications between the local and remote devices. The determined round-trip time may be stored at one or both of the local device and the remote device, and used the in communicating additional data between the devices.

In a more particular implementation, the steps of synchronizing the local device's clock and re-synchronizing the remote device's clock are repeated. A message is transmitted in respective sets of HF signals communicated between the local and remote devices, and the round-trip time is iteratively determined for communicating the messages until the accuracy of the determined round-trip time achieves a threshold.

In various embodiments, the communication is carried out using an authentication approach, involving authenticating one or both of the local and remote devices based on an encrypted estimate of the trip time. The authentication can be used for controlling access of the remote device to the local device. In some implementations, the authentication is carried out by sending a replay message, including an encrypted nonce, based on a message communicated between the local device and the remote device.

Another embodiment is directed to an apparatus for communicating between a local device having a first clock, a low-frequency (LF) transmitter and a high-frequency (HF) transceiver, and a remote device having a second clock, an LF receiver and an HF transceiver. LF and HF communications may, for example, be carried out using a single channel or separate channels, and separate or combined receiver/transmitter/transceiver components. The apparatus includes an LF communication circuit that communicates an LF signal from the local device to the remote device, and provides synchronization of the second clock at the remote device based on the LF signal. The apparatus also includes an HF communication circuit that operates with the LF communication circuit to provide synchronization as follows. A first HF signal is communicated from the remote device to the local device using the second clock and a first predetermined time delay relative to receipt of the LF signal at the remote device. The first clock is synchronized based on the first HF signal, and a second HF signal is communicated from the local device to the remote device using the first clock and a second predetermined time delay relative to receipt of the first HF signal at the local device. The second clock is re-synchronized based on the second HF signal, while accounting for a trip time for at least one of: communicating the first HF signal from the remote device to the local device, and communicating the second HF signal from the local device to the remote device. As consistent with the above, this approach may be implemented with various embodiments, including those directed to the local device, to the remote device, or to both the local and remote devices.

As consistent with the above discussion, various embodiments are directed to a local device, a remote device, or a combination of both. In some embodiments, the apparatus above is directed to the remote device, in which the LF communication circuit is the LF receiver and the HF communication circuit is the HF transceiver. In other embodiments, the apparatus is directed to a local device in which the LF communication circuit is the LF transmitter and the HF communication circuit is the HF transceiver. In certain embodiments directed to both the local and remote devices, the LF communication circuit includes the LF transmitter in the local device and the LF receiver in the remote device, and the HF communication circuit includes the HF transceivers in the local and remote devices.

Various embodiments are directed to communicating duty-cycled signals, such as in an environment benefiting from low power. In a particular such embodiment, the LF communication circuit communicates the LF signal using duty-cycled packet detection for data in the LF signal, and provides the synchronization of the second clock via the LF signal. With this approach, both power consumption and latency overhead can be reduced, relative to synchronization via the HF signals (e.g., without coarse synchronization with the LF signals).

Other embodiments involve an authentication circuit that provides authentication for the remote device and access to the local device, based on an encrypted estimate of the trip time for communicating a message via the HF signals. For instance, the round-trip time can be determined from a time at which the first HF signal is transmitted from the remote device, to a time at which the second HF signal is received at the remote device.

Various embodiments are directed to RF ranging systems that employ a time-of-flight principle to determine a distance between two objects or markers on objects. Time-of-flight is determined by transmitting a waveform, such as a chirp or a pulse, from one of the objects and retransmitting the waveform from the other one of the objects. The distance between the objects can be determined/calculated, and synchronization is carried out based on the transmissions.

Turning now to the figures, FIG. 1 shows a communication apparatus 100 and approach involving synchronization and time-of-flight calculation, as may be implemented in accordance with various embodiments, some of which may employ other time-of-flight determination. At a local device 110, an LF signal is transmitted at block 112, and the signal is received and processed for clock synchronization and for providing a time delay at block 122 in a remote device 120. The remote device 120 transmits a first HF signal at block 124, based on the synchronization and time delay, with the signal being received at block 114 of the local device 110. The local device 110 uses the first HF signal to carry out synchronization and time delay aspects at block 114, and transmits a second HF signal at block 116. The remote device 120 uses the second HF signal to re-synchronize its clock at block 126. In this regard, coarse synchronization can be effected via the initial LF signal, and used to facilitate timing alignment via subsequent HF signals.

In a particular time-of-flight implementation, transmitter 130 (e.g., corresponding to blocks 120/124) sends a time-of-flight challenge signal to receiver 140 (e.g., corresponding to blocks 110/114), and transmitter 142 (e.g., corresponding to blocks 110/116) responds with a time-of-flight response signal that is received by receiver 132 (e.g., corresponding to blocks 120/126). A time-of-flight counter 150 determines time elapsed between transmission of the time-of-flight challenge by transmitter 130 and reception of the time-of-flight response at receiver 132. Processing time circuitry 152 provides a fixed or measured processing time delay for signals to be retransmitted. Distance between the devices can then be determined based on the total time, less processing time at the receiver/transmitter 140/142, and any added delay as discussed above.

Such an approach may, for example, be carried out with the transmitter and receiver 130 and 132 at the local device 110, and the receiver 140 and transmitter 142 implemented at the remote device 120, with the time-of-flight pertaining to the initial LF signal and the first HF signal as discussed above. Such an approach may also be carried out in reverse, with the transmitter and receiver 130 and 132 at the remote device 120, and the receiver 140 and transmitter 142 implemented at the local device 110, with the time-of-flight pertaining to the transmission of the HF signals. In some implementations, such an approach may be carried out, with time-of-flight being determined at both the local and remote devices, based on LF signals, HF signals or a combination of LF and HF signals. For instance, blocks 112 and 122 can be implemented as LF transceivers, with an additional LF communication going from block 122 to block 112. Further iterations of the transmission of HF signals may be carried out to fine tune synchronization.

Figure 2:
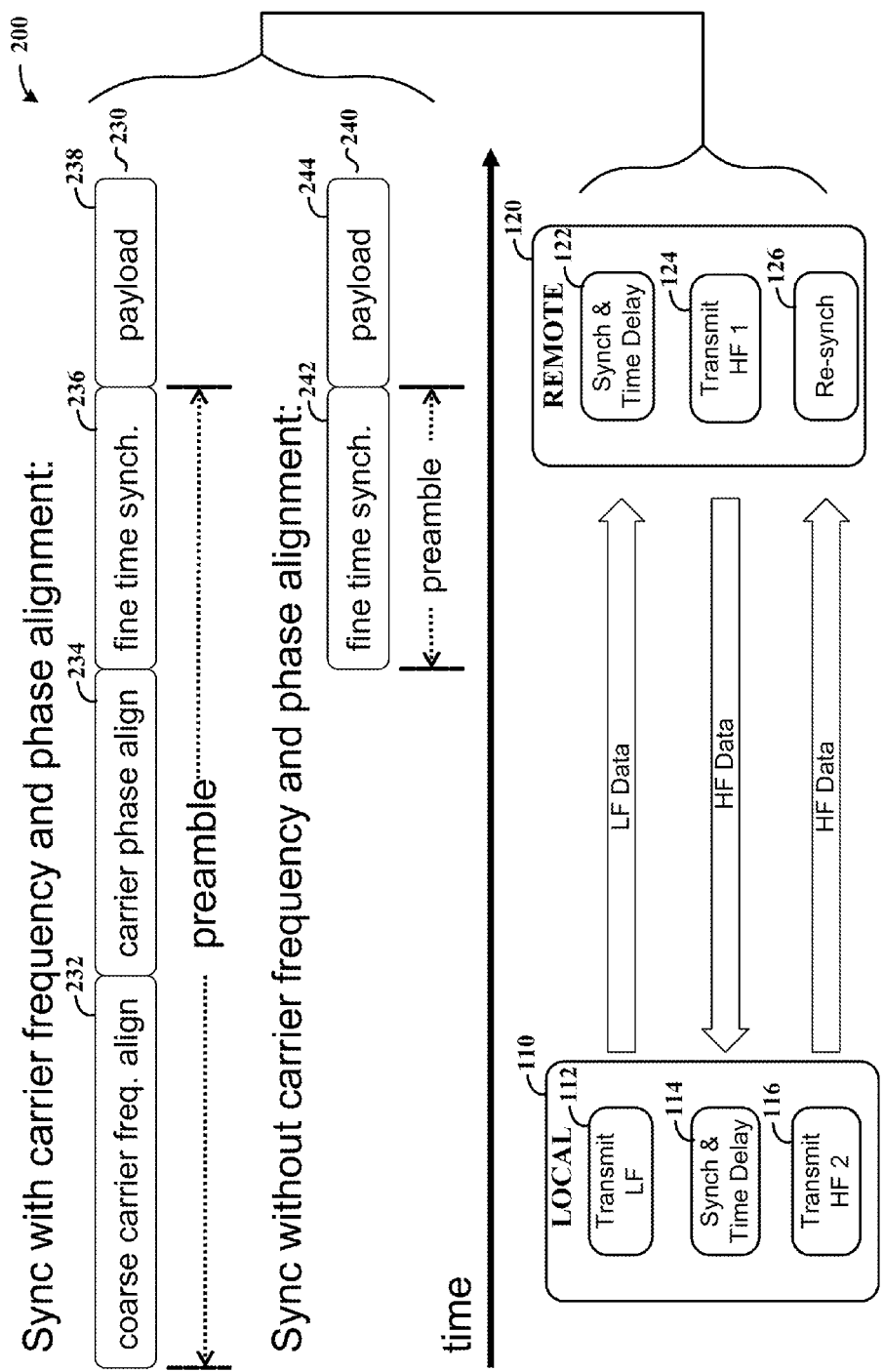
FIG. 2 shows a communication approach and radio packet structure as may be implemented in accordance with one or more embodiments.

FIG. 2 shows a communication approach 200 as may be implemented in accordance with the above-discussed approach in FIG. 1, with similar components at local and remote devices 110 and 120 being consistently labeled. The transmission of data between the local and remote devices 110 and 120 is carried out using a packet, or waveform, that is transmitted for trip time calculation. In some implementations, packet 230 is transmitted with a preamble having coarse carrier frequency alignment data 232, carrier phase alignment data 234, fine time synchronization data 236, and with a payload 238. In other implementations, packet 240 is transmitted having a preamble with fine time synchronization data 242, and a payload 244. Such approaches may be used in a variety of applications. For instance, in low-latency applications such as for automobile access, synchronization may involve a preamble length that exceeds the length of the payload data, as with either packets 230 or 240. In such embodiments, synchronization as characterized with one or more embodiments herein can be carried out, such that the carrier frequency or symbols may not necessarily be used for synchronization.

In a particular embodiment, a side-channel can be used (e.g., in the LF communication at blocks 112 and 122) to provide coarse synchronization and limit the time needed to do fine synchronization for a main (e.g., HF) channel, in the communication of such packets. As such, a two-step approach is used with an LF transmission that provides coarse synchronization for a transceiver that provides accurate RF ranging. The LF transceiver may include a variety of wireless circuits/links such as, for example, 125 kHz magnetic links, 13.56 MHz NFC links, sub-GHz ISM (industrial, scientific and medical) links, Bluetooth enhanced data rate (EDR) or low energy (LE) links, IEEE802.11 links, or 500 kHz-15 MHz magnetic or (body-centric) capacitive links. In one such implementation, LF circuits establish a link and effect polling that may be desired, and provide a first range estimation based on signal strength. Next, the LF circuits provide timing synchronization and pre-synchronization of HF transceivers that carry out RF ranging, which can minimize unnecessary listening and synchronization-related latency. In this way, both power consumption and latency overhead due to RF ranging link can be reduced or minimized.

Figure 3A:
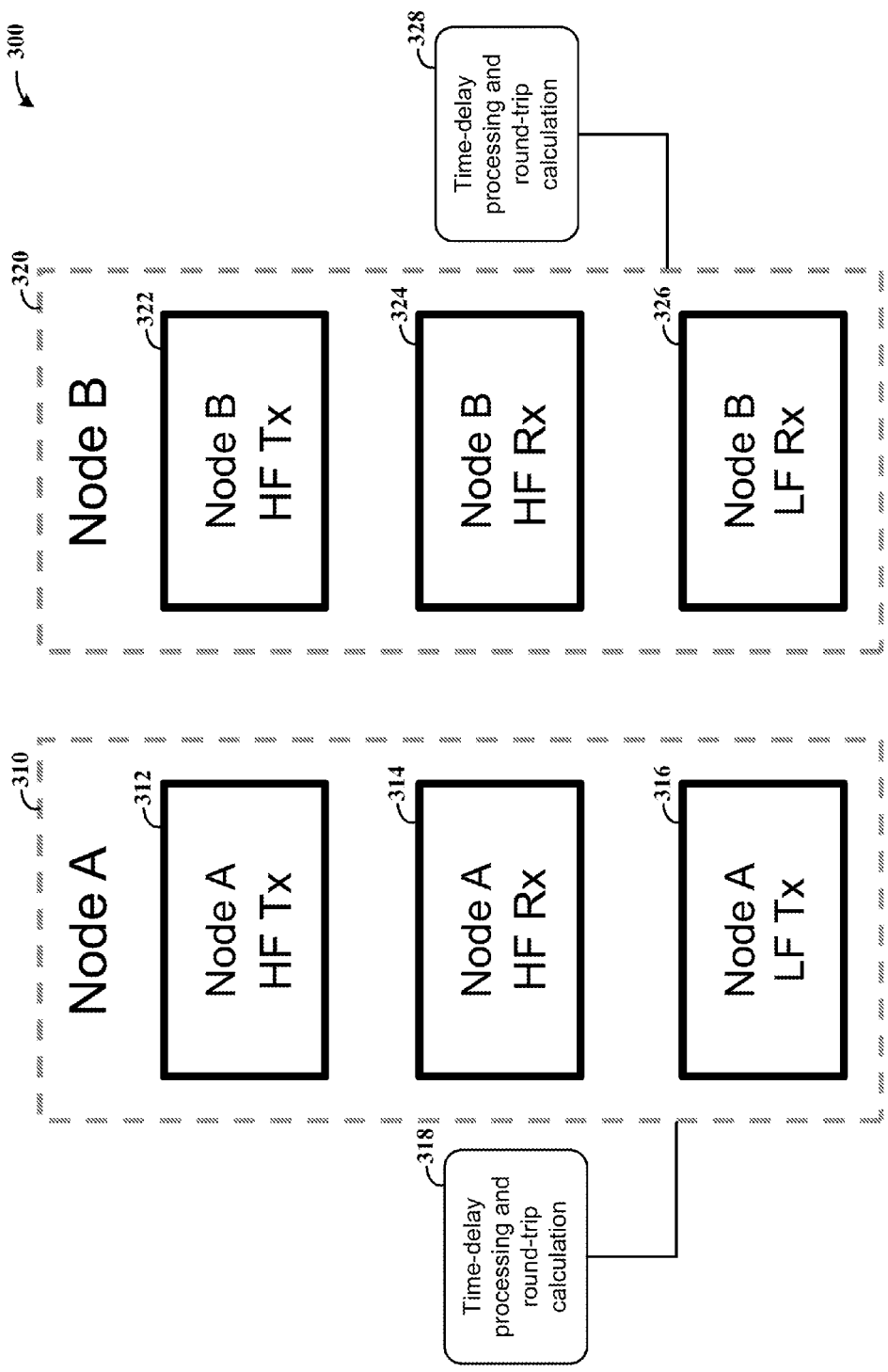
FIG. 3A shows a communication apparatus, in accordance with another example embodiment.

FIG. 3A shows a communication apparatus 300, in accordance with another example embodiment. The communication apparatus 300 includes two communication nodes 310 (depicted as Node A) and 320 (depicted as Node B), which may be implemented as local and remote devices as characterized herein. Node 310 includes HF transmitter 312 and HF receiver 314, which may be combined in an HF transceiver, and an LF transmitter 316. Node 320 includes an HF transmitter 322 and HF receiver 324, which may be combined in an HF transceiver, and an LF receiver 326. In some implementations, the LF transmitter 316 and LF receiver 326 are transceivers, to facilitate bidirectional LF communications between the nodes 310 and 320.

In some implementations, node 310 carries out time-delay processing and round-trip calculation at block 318 as described herein. In other implementations, node 320 carries out such time-delay processing and round-trip calculation at block 328. In other implementations, both nodes 310 and 320 respectively employ blocks 318 and 328. This processing and calculation can be carried out using LF communications, HF communications, or a combination of LF and HF communications.

In a particular implementation, node 310 and node 320 communicate as follows, such as in using a 125 kHz LF signal and a 4.4 GHz IR-UWB RF HF signal. First, the LF transmitter 316 is enabled, based on a trigger or as part of a polling scheme, and the LF receiver 326 is also enabled (e.g., simultaneously, and temporarily). An LF signal is transmitted from LF transmitter 316 at node 310, and the LF receiver 326 at node 320 detects the LF signal, based on a trigger or as part of a continuous listening scheme. The LF receiver 326 at node 320 synchronizes its clock with node 310 based on the LF signal.

The HF transmitter 322 at node 320 is enabled using the same clock that was used to synchronize at LF, and sends an HF signal to node 310 with a predetermined time delay, relative to an LF packet in the LF signal. The HF receiver 314 at node 310 receives HF signal and synchronizes quickly due to the synchronization of node 320 to the prior LF signal.

The HF transmitter 312 is enabled at node 310, and the HF receiver 324 is enabled at node 320. The HF transmitter 312 transmits another HF signal with a predetermined time delay, relative to the HF packet received from node 320 via the initial HF signal. The HF receiver 324 at node 320 receives HF signal, and synchronizes quickly via the synchronization of node 320 to the prior LF signal (and, e.g., the synchronization of node 310 to the prior HF signal). Round-trip calculations can be performed at node 320 and/or node 310, based on the communications.

In some implementations, multiple similar HF messages are exchanged until node 320 holds a sufficiently accurate round-trip time estimate. Where multiple messages are sent, the resulting improved round-trip time estimates can also be kept at node 310. Once the round-trip time estimate is sufficiently accurate, either node 320 sends the encrypted estimate back to node 310, or node 310 already holds the correct estimate (e.g., from a previous calculation). If node 310 determines that node 320 is an intended party (e.g., based on encrypted communications and/or a secure element), and the round-trip time estimate indicates that the distance between the nodes is sufficiently small, access of a user at node 320 to node 310 (e.g., as an access point) can be permitted/unlocked. In some implementations, the direction of the LF communication as discussed above is reversed with respect to the direction of the RF communication. Further, in some implementations node 320 is implemented as an access point that provides access to node 310, with the communications carried out in accordance with the above and verification at node 320.

Figure 3B:
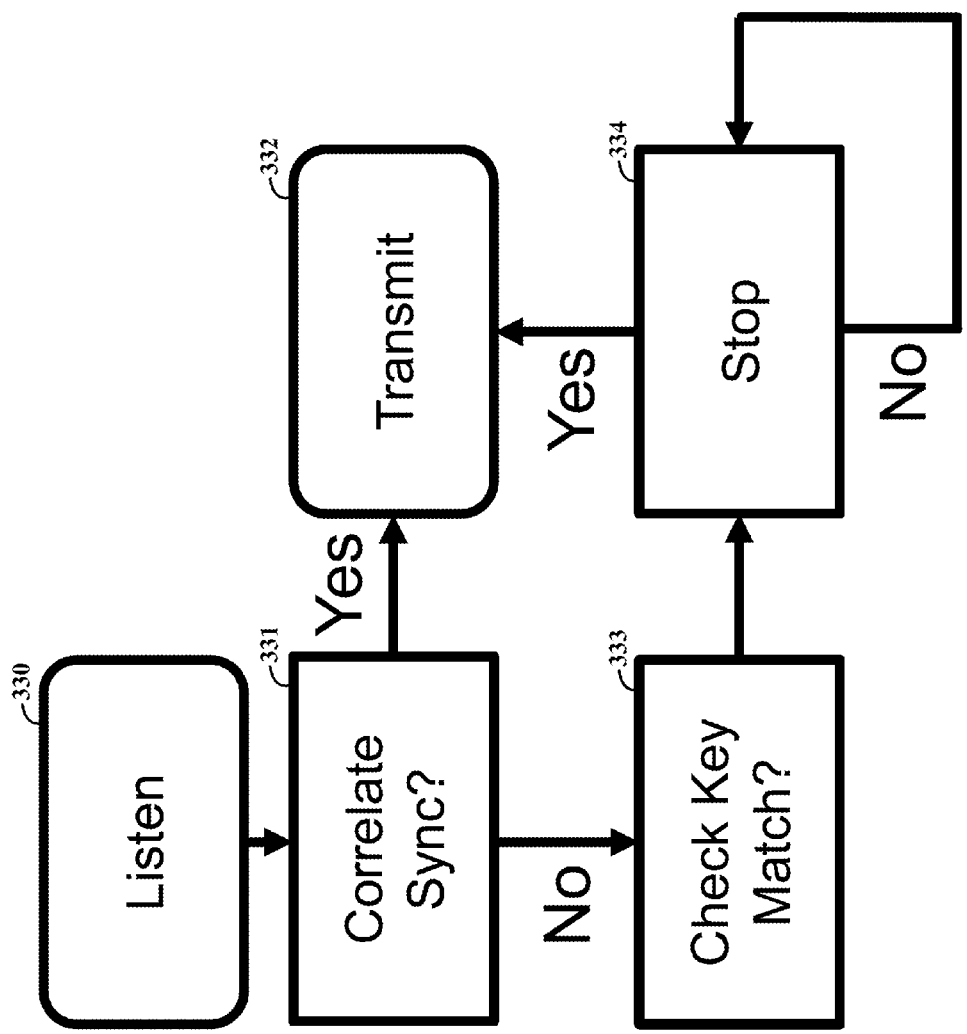
FIG. 3B shows an example approach to synchronization, as may be implemented with FIG. 3A.

FIG. 3B shows an example approach to synchronization as may be implemented with FIG. 3A. At block 330, a node listens and, if synchronization is to be correlated at block 331, a response is transmitted at block 332. If the synchronization is not needed at block 331, a key match is checked at block 333. If the key match is correct at block 333, the process ends at block 334 with a corresponding transmission at block 332. If the key match is incorrect at block 333, the process stops at block 334.

Figure 3C:
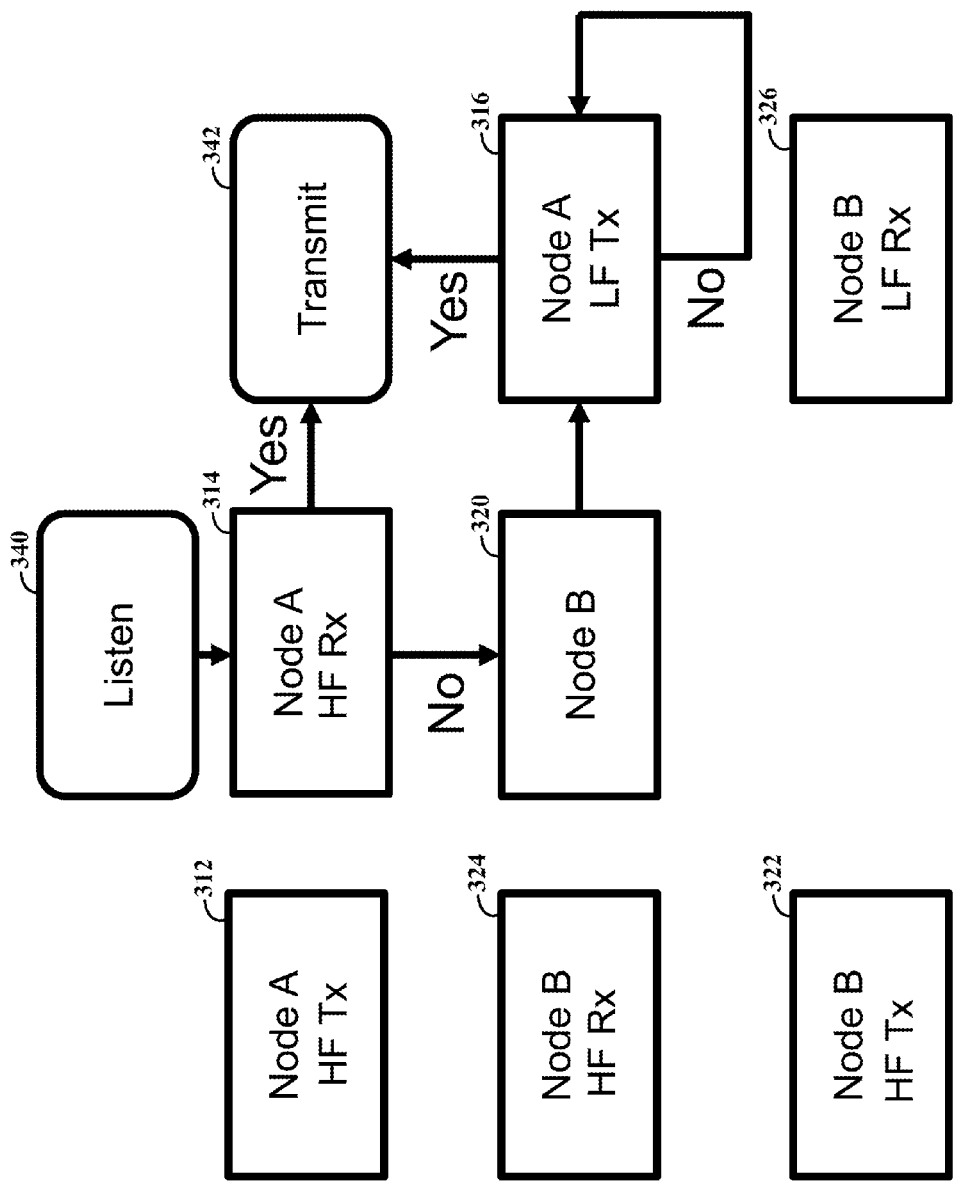
FIG. 3C shows another synchronization approach, as may be implemented with FIG. 3A.

FIG. 3C shows another synchronization approach, as may be implemented with FIG. 3A and related components as shown in FIG. 3C. Node 310's HF transmitter 312, HF receiver 314 and LF transmitter 316 are shown, as are node 320's HF transmitter 322, HF receiver 324 and LF transmitter 326. At block 316, node 310 transmits an LF signal at block 342, and listens at block 340 via HF receiver 314 for an HF response. If a response is detected, node 310 transmits an HF response at block 342. If an HF response is not detected from node 320, the process continues at block 316 with an LF transmission.

Figure 4:
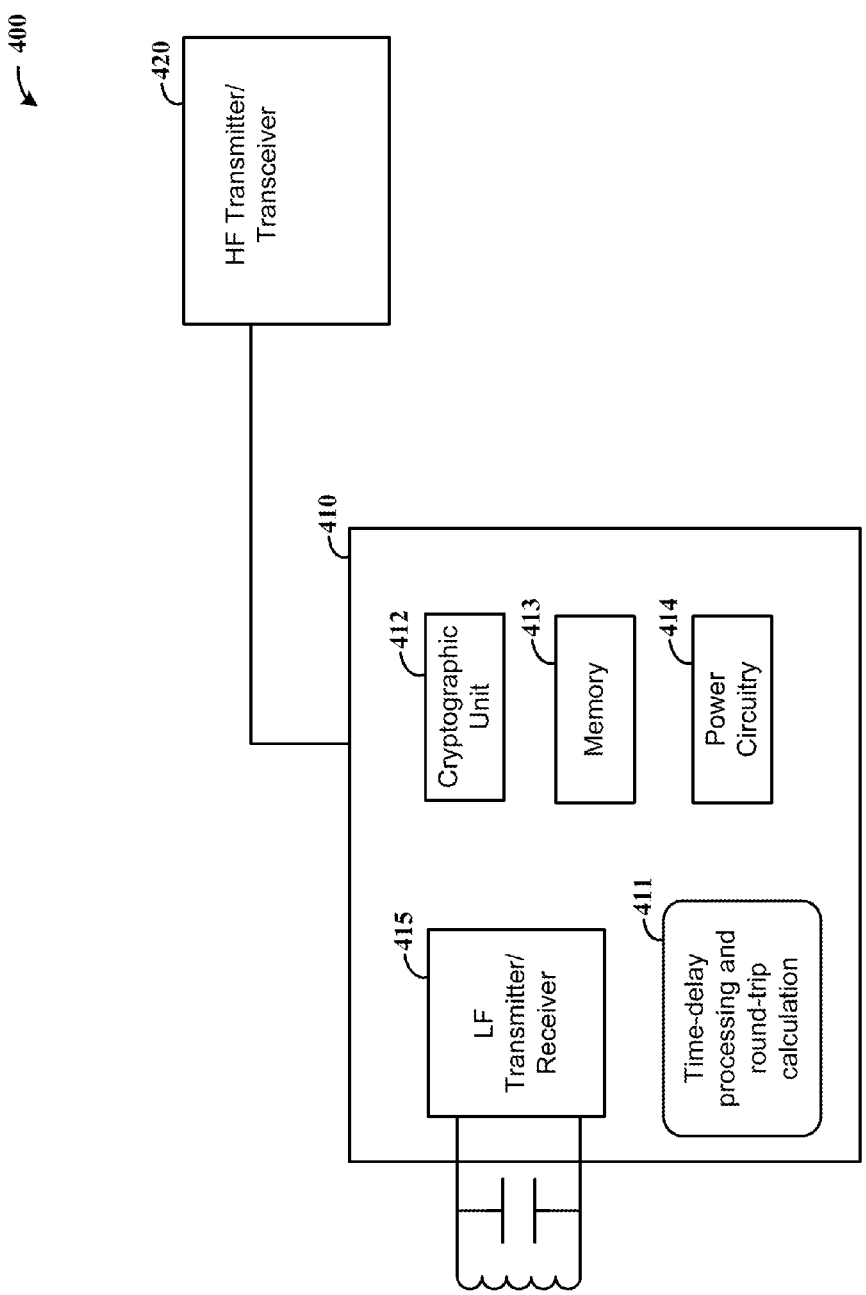
FIG. 4 shows a circuit for wireless communication, in accordance with another example embodiment.

In various embodiments as shown in FIGS. 1-3C, the communications are carried out in devices to various protocols and systems. For example, FIG. 4 shows an LF+HF apparatus 400, as may be implemented on a remote key side of an automobile access system. The apparatus 400 includes circuitry 410 having time-delay processing and round-trip calculation circuitry/block 411, cryptographic unit 412 (e.g., including a secure element), memory 413, power circuitry 414 and an LF transmitter and/or receiver 415. An HF transmitter/transceiver 420 includes one or more receivers and transmitters. In some embodiments, the memory 413 includes one or more of RAM, ROM, EROM, or EEPROM. The apparatus 400 may include one or more additional components, such as analog-to-digital converters, other processors, baseband and wake-up processing. A similar approach may be implemented on the base station/automobile side, in which one of the three LF frontends, as shown in LF portion 415, is used. For general information regarding communications, and for specific information regarding immobilizer applications to which one or more embodiments (e.g., as in FIG. 4) may be applied, reference may be made to the PCF7952 datasheet and related circuitry therein, as available from NXP Semiconductors of Eindhoven, The Netherlands, which is fully incorporated herein by reference.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., transmitter and receiver, memory, synchronization, time delay, memory, and processing). For example, in certain of the above-discussed embodiments, one or more modules are discrete logic circuits or programmable logic circuits configured and arranged for implementing these operations/activities, as in the circuit modules shown in FIGS. 1 and 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, certain apparatuses shown in the figures may be separated into embodiments in a single component or node (local/remote device), or combined. Further, certain operations such as synchronization as shown can be carried out in different communication devices, such as by flipping operation of the local and remote devices as described. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method for communicating between a local device having a first clock, a low-frequency (LF) transmitter and a high-frequency (HF) transceiver, and a remote device having a second clock, an LF receiver and an HF transceiver, the method comprising:
   transmitting an LF signal from the local device to the remote device;
   at the remote device, synchronizing the second clock based on the LF signal, and transmitting a first HF signal to the local device using the synchronized second clock and a first predetermined time delay relative to receipt of the LF signal at the remote device;
   at the local device, synchronizing the first clock based on the first HF signal, and transmitting a second HF signal to the remote device using the first clock and a second predetermined time delay relative to receipt of the first HF signal at the local device; and
   at the remote device, re-synchronizing the second clock based on the second HF signal and while accounting for a trip time for at least one of communicating the first HF signal from the remote device to the local device, and communicating the second HF signal from the local device to the remote device.

2. The method of claim 1, wherein
   at least one of the local and remote devices operates using duty-cycled packet detection for packets having a preamble that is longer than a payload of the packet;
   the local and remote devices transmit and receive the LF signal respectively using an LF transmitter and an LF receiver; and
   the local and remote devices transmit and receive the HF signals using HF transceivers that are respectively separate from the LF transmitter and the LF receiver, thereby minimizing both power consumption and latency overhead due to RF ranging in the communications.

3. The method of claim 1, wherein synchronizing the first clock includes synchronizing the first clock based on the first HF signal, the first predetermined time delay, and a time at which the LF signal was transmitted from the local device.

4. The method of claim 1, wherein re-synchronizing the second clock based on the second HF signal includes re-synchronizing the second clock based on the second predetermined time delay and a time at which the first HF signal was transmitted.

5. The method of claim 1, wherein
   synchronizing the first clock includes synchronizing the first clock based on the first HF signal, the first predetermined time delay, and a time at which the LF signal was transmitted from the local device, and
   re-synchronizing the second clock based on the second HF signal includes re-synchronizing the second clock based on the second predetermined time delay and a time at which the first HF signal was transmitted.

6. The method of claim 1, further including providing authentication for the remote device and access to the local device by the remote device, based on an encrypted estimate of the trip time.

7. The method of claim 6, wherein authenticating includes sending a replay message, including an encrypted nonce, based on a message communicated between the local device and the remote device.

8. The method of claim 1, wherein transmitting the LF signal includes transmitting the LF signal over an LF channel, and wherein transmitting the HF signals includes transmitting the HF signals over an HF channel that is separate from the LF channel.

9. The method of claim 1, wherein re-synchronizing the second clock based on the second HF signal and while accounting for the trip time includes determining, at the remote device, a round-trip time for communicating a message in the first HF signal from the remote device to the local device, and for retransmitting the message in the second HF signal from the local device back to the remote device, thereby providing for correction of timing misalignment between the local and remote devices.

10. The method of claim 9, further including encrypting the determined round-trip time at the remote device, transmitting the encrypted round-trip time to the local device, and using the encrypted round-trip time for authentication of communications between the local and remote devices.

11. The method of claim 10, further including
using a determined round-trip time at both the local device and the remote device, for round-trip times for at least one of: the LF signal and first HF signal, and two HF signals, and
using the determined round-trip time in communicating additional data between the local and remote devices.

12. The method of claim 9, further including repeating the steps of synchronizing the first clock and re-synchronizing the second clock by transmitting a message in respective sets of HF signals between the local and remote devices, calculating the round-trip time for communicating the message in each set from the remote device to the local device and back to the remote device, and re-determining the round-trip time until the accuracy of the determined round-trip time achieves a threshold.

13. A method for authenticating a remote device for accessing a local device, the method comprising:
synchronizing a clock at the remote device based on an LF signal communicated by the local device;
transmitting a message in a first HF signal from the remote device to the local device, using the synchronized clock and a first predetermined time delay;
in the local device, responding to the first HF signal by synchronizing a clock at the local device based on the first HF signal, and transmitting the message back to the remote device in a second HF signal using the synchronized clock and a second predetermined time delay;
in the remote device, responding to the second HF signal by re-synchronizing the clock at the remote device, determining a round-trip time for communicating the message from the remote device to the local device and back to the remote device, encrypting the determined round-trip time, and communicating the encrypted round-trip time to the local device; and
in the local device, providing access to data by the remote device based on the encrypted round-trip time.

14. The method of claim 13, wherein synchronizing the clock at the remote device includes transmitting the LF signal via an LF transmitter at the local device to an LF receiver at the remote device and pre-synchronizing an HF transceiver at the remote device, further including:
establishing a communication link between the local and remote devices via an LF polling process including the LF signal,
estimating a distance between the local and remote devices based on strength of LF signals communicated during the polling process, and
pre-synchronizing an HF transceiver at the local device based on the LF polling process and the estimating, thereby minimizing both power consumption and latency overhead due to RF ranging in communications between the local and remote devices.

15. An apparatus for communicating between a local device having a first clock, a low-frequency (LF) transmitter and a high-frequency (HF) transceiver, and a remote device having a second clock, a LF receiver and a HF transceiver, the apparatus comprising:
an LF communication circuit configured and arranged to
communicate an LF signal from the local device to the remote device; and
provide synchronization of the second clock at the remote device based on the LF signal; and
an HF communication circuit configured and arranged with the LF communication circuit to provide synchronization by
communicating a first HF signal from the remote device to the local device using the second clock and a first predetermined time delay relative to receipt of the LF signal at the remote device,
providing synchronization of the first clock based on the first HF signal, and communicating a second HF signal from the local device to the remote device using the first clock and a second predetermined time delay relative to receipt of the first HF signal at the local device, and
providing re-synchronization of the second clock based on the second HF signal and while accounting for a trip time for at least one of communicating the first HF signal from the remote device to the local device, and communicating the second HF signal from the local device to the remote device.

16. The apparatus of claim 15, wherein:
the LF communication circuit is the LF receiver in the remote device, and
the HF communication circuit is the HF transceiver in the remote device.

17. The apparatus of claim 15, wherein:
the LF communication circuit is the LF transmitter in the local device, and
the HF communication circuit is the HF transceiver in the local device.

18. The apparatus of claim 15, wherein:
the LF communication circuit includes the LF transmitter in the local device and the LF receiver in the remote device, and
the HF communication circuit includes the HF transceivers in the local and remote devices.

19. The apparatus of claim 15, wherein the LF communication circuit is configured and arranged to communicate the LF signal using duty-cycled packet detection for data in the LF signal, and to provide the synchronization of the second clock by providing synchronization via the LF signal, thereby reducing both power consumption and latency overhead relative to synchronization via the HF signals.

20. The apparatus of claim 15, further including an authentication circuit configured and arranged to provide authentication for the remote device and access to the local device based on an encrypted estimate of the trip time for communicating a message via the first HF signal from the remote device to the local device, and for communicating the message from the local device back to the remote device via the second HF signal.

* * * * *